US010512051B2

(12) United States Patent
Ly et al.

(10) Patent No.: US 10,512,051 B2
(45) Date of Patent: Dec. 17, 2019

(54) UNIFIED SYNCHRONIZATION DESIGN UNDER MIXED DEPLOYMENTS

(71) Applicant: QUALCOMM Incorporated, San Diego, CA (US)

(72) Inventors: Hung Ly, San Diego, CA (US); Tao Luo, San Diego, CA (US); Peter Gaal, San Diego, CA (US); Haitong Sun, Cupertino, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/855,623

(22) Filed: Dec. 27, 2017

(65) Prior Publication Data

US 2018/0324720 A1 Nov. 8, 2018

Related U.S. Application Data

(60) Provisional application No. 62/501,463, filed on May 4, 2017.

(51) Int. Cl.
*H04J 3/06* (2006.01)
*H04W 56/00* (2009.01)
(Continued)

(52) U.S. Cl.
CPC ......... *H04W 56/001* (2013.01); *H04L 5/0051* (2013.01); *H04W 72/005* (2013.01)

(58) Field of Classification Search
None
See application file for complete search history.

(56) References Cited

U.S. PATENT DOCUMENTS 8,437,303 B2 5/2013 Dinan et al.
9,408,122 B2 8/2016 Tsai et al.
(Continued)

OTHER PUBLICATIONS

Huawei., et al., "NB-IOT—downlink physical layer concept description", 3GPP Draft, R1-156462, 3rd Generation Partnership Project (3GPP), Mobile Competence Centre, 650, Route Des Lucioles, F-06921, Sophia-Antipolis Cedex, France, vol. RAN WG1, no. Anaheim, USA, Nov. 15, 2015-Nov. 22, 2015, Nov. 15, 2015 (Nov. 15, 2015), XP051039851, 11 pages. Retrieved from the Internet: URL:http://www.3gpp.org/ftp/Meetings3GPPSYNC/RAN1/Docs/.
(Continued)

*Primary Examiner* — Kwang B Yao
*Assistant Examiner* — Juvena W Loo
(74) *Attorney, Agent, or Firm* — Norton Rose Fulbright US LLP

(57) ABSTRACT

Systems and methods herein create unified synchronization to support various network deployments in which multiple UE states (e.g., idle, connected, etc) and multiple synchronization signal periodicities (5 ms, 20 ms, etc.) and standalone/non-standalone networks may exist. Unified synchronization may be achieved at least by designating transmit frames as being even or odd. With such a designation, when a network transmits synchronization signals (SS) comprising the most significant bits (MSB)s of a frame's system frame number (SFN), a UE of any state may receive the SS according to any periodicity and blind decode the SFN's least significant bits (LSBs) with less complexity as compared to traditional systems and methods due at least to the even or odd frame designations.

30 Claims, 15 Drawing Sheets

(51) Int. Cl.
*H04L 5/00* (2006.01)
*H04W 72/00* (2009.01)

(56) References Cited

U.S. PATENT DOCUMENTS

| | | |
|---|---|---|
| 2014/0098761 A1 | 4/2014 | Lee et al. |
| 2016/0057562 A1 | 2/2016 | Fang et al. |
| 2016/0128011 A1 | 5/2016 | Yang et al. |
| 2018/0227867 A1* | 8/2018 | Park .................. H04L 5/005 |
| 2018/0279241 A1* | 9/2018 | Lee .................... H04W 56/001 |

OTHER PUBLICATIONS

Qualcomm Incorporated: "NB-PBCH Design", 3GPP Draft, R1-160102, NB-PBCH Design, 3rd Generation Partnership Project (3gpp), Mobile Competence Centre, 650, Route Des Lucioles, F-06921 Sophia-Antipolis Cedex, France, vol. RAN WG1, no. Budapest, HU, Jan. 18, 2016-Jan. 20, 2016, Jan. 12, 2016 (Jan. 12, 2016), XP051064715, Retrieved from the Internet: URL: http://www.3gpp.org/ftp/tsg_ran/WG1_RL1/TSGR1_AH/LTE_NB-IoT_1601/Docs/.
International Search Report and Written Opinion—PCT/US2018/026267—ISA/EPO—dated Jul. 18, 2018.
Qualcomm Incorporated: "PBCH Design Considerations," 3GPP Draft; R1-1705568, PBCH Design Consideration, 3rd Generation Partnership Project (3GPP), Mobile Competence Centre; 650, Route Des Lucioles; F-06921, Sophia-Antipolis Cedex; France, vol. RAN WG1, Spokane, USA; Apr. 3, 2017-Apr. 7, 2017, Apr. 2, 2017 (Apr. 2, 2017), XP051243696, Retrieved from the Internet: URL: http://www.3gpp.org/ftp/Meetings_3GPP_SYNC/RAN1/Docs/ [retrieved on Apr. 2, 2017].

* cited by examiner

UNIFIED SYNCHRONIZATION DESIGN UNDER MIXED DEPLOYMENTS

CROSS-REFERENCE TO RELATED APPLICATIONS

This application claims priority to and the benefit of U.S. Provisional Patent Application No. 62/501,463, entitled, "UNIFIED SYNCHRONIZATION DESIGN UNDER MIXED DEPLOYMENTS," filed on May 4, 2017, the disclosure of which is hereby incorporated by reference herein in its entirety as if fully set forth below and for all applicable purposes.

TECHNICAL FIELD

Aspects of the present disclosure relate generally to wireless communication systems, and more particularly, to designing a unified synchronization to support various network deployments in which multiple UE states and multiple synchronization signal periodicities and standalone/non-standalone networks may exist. Embodiments can provide wireless communications with high reliability and low latency operational characteristics.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs (e.g., gNBs) that can support communication for a number of user equipment's (UEs). A UE may communicate with a base station via downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

As the demand for mobile broadband access continues to increase, transmission frequencies increase, more UEs access long-range wireless communication networks, and more short-range wireless systems are being deployed within a sector. In short, network congestion continues to grow. With ever increasing data transmissions and congestion, synchronization between a transmitting device and UE grows in importance as well. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Systems and methods herein create unified synchronization to support various network deployments in which multiple UE states (e.g., idle, connected, etc.) and multiple synchronization signal periodicities (5 ms, 2.0 ms, etc.) and standalone/non-standalone networks may exist. Unified synchronization may be achieved at least by designating transmit frames as being even or odd. With such a designation, when a network transmits synchronization signals (SS) comprising the most significant bits (MSB)s of a frame's system frame number (SFN), a UE of any state may receive the SS according to any periodicity and blind decode the SFN's least significant bits (LSBs) with less complexity as compared to traditional systems and methods due at least to the even or odd frame designations.

In one aspect of the disclosure, a method is provided. For example, a method can include a UE receiving a frame comprising a physical broadcast channel PBCH, wherein the PBCH includes a MIB comprising most significant bits (MSB)s of a frame's system frame number (SFN). Further, the UE may decode the MSBs of the SFN and determine whether the frame is designated in either of a binary setting (e.g., an even frame or an odd frame) based at least on an indication included within a synchronization signal burst set (SSBS) of the frame. Based at least on the decoded MSBs and the frame designation, the UE may blind decode a subset of the less significant bits (LSB)s of the SFN to determine which of the subset of the LSBs are part of the SFN. In various embodiments, the frame designation may be included in various locations within a frame.

In an additional aspect of the disclosure, a method may comprise generating, by a transmitting device, physical broadcast channel PBCH, wherein the PBCH includes a MIB comprising most significant bits (MSB)s of an SFN of a frame. Further, the method may comprise generating at least one PBCH RV comprising less significant bits (LSB)s of the SFN of the frame and creating an indication within a synchronization signal burst set (SSBS) indicating whether the frame is designated an even frame or an odd frame. Further still, the method may comprise including within the frame the MIB, the at least one PBCH RV, and the indication and transmitting the frame, in various embodiments, the frame designation may be included in various locations within a frame.

In an additional aspect of the disclosure, a user equipment (UE) device may comprise a receiver that receives a frame comprising an physical broadcast channel (PBCH), wherein the PBCH includes a master information block (MIB) comprising most significant bits (MSB)s of a system frame number (SFN) of the frame. Further, the UE may comprise one or more processor that decodes the MSBs of the SFN and determines whether the frame is designated an even frame or an odd frame based at least on an indication included within a synchronization signal burst set (SSBS) of the frame, wherein based at least on the decoded MSBs and the frame designation the one or more processor blind decodes a subset of less significant bits (LSB)s of the SFN to determine which of the subset of the LSBs are part of the SFN. In various embodiments, the frame designation may be included in various locations within a frame.

In an additional aspect of the disclosure, a system may comprise code for receiving, by a user equipment (UE), a frame comprising an physical broadcast channel PBCH, wherein the PBCH includes a master information block (MIB) comprising most significant bits (MSB)s of a system frame number (SFN) of the frame. The system may include further code for decoding the MSBs of the SFN and code for determining whether the frame is designated an even frame or an odd frame based at least on an indication included within a synchronization signal burst set (SSBS) of the frame. Further still, the system may comprise code for based at least on the decoded MSBs and the frame designation, blind decoding a subset of a less significant bits (LSB)s of the SFN to determine which of the subset of the LSBs are part of the SEN. In various embodiments, the frame designation may be included in various locations within a frame.

In an additional aspect of the disclosure, a system may comprise means for receiving, by a user equipment (UE), a frame comprising an physical broadcast channel PBCH, wherein the PBCH includes a master information block (MIB) comprising most significant bits (MSB)s of a system frame number (SFN) of the frame. The system may include further means for decoding the MSBs of the SFN and means for determining whether the frame is designated an even frame or an odd frame based at least on an indication included within a synchronization signal burst set (SSSS) of the frame. Further still, the system may comprise means for based at least on the decoded MSBs and the frame designation, blind decoding a subset of a less significant bits (LSB)s of the SFN to determine which of the subset of the LSBs are part of the SFN. In various embodiments, the frame designation may be included in various locations within a frame.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
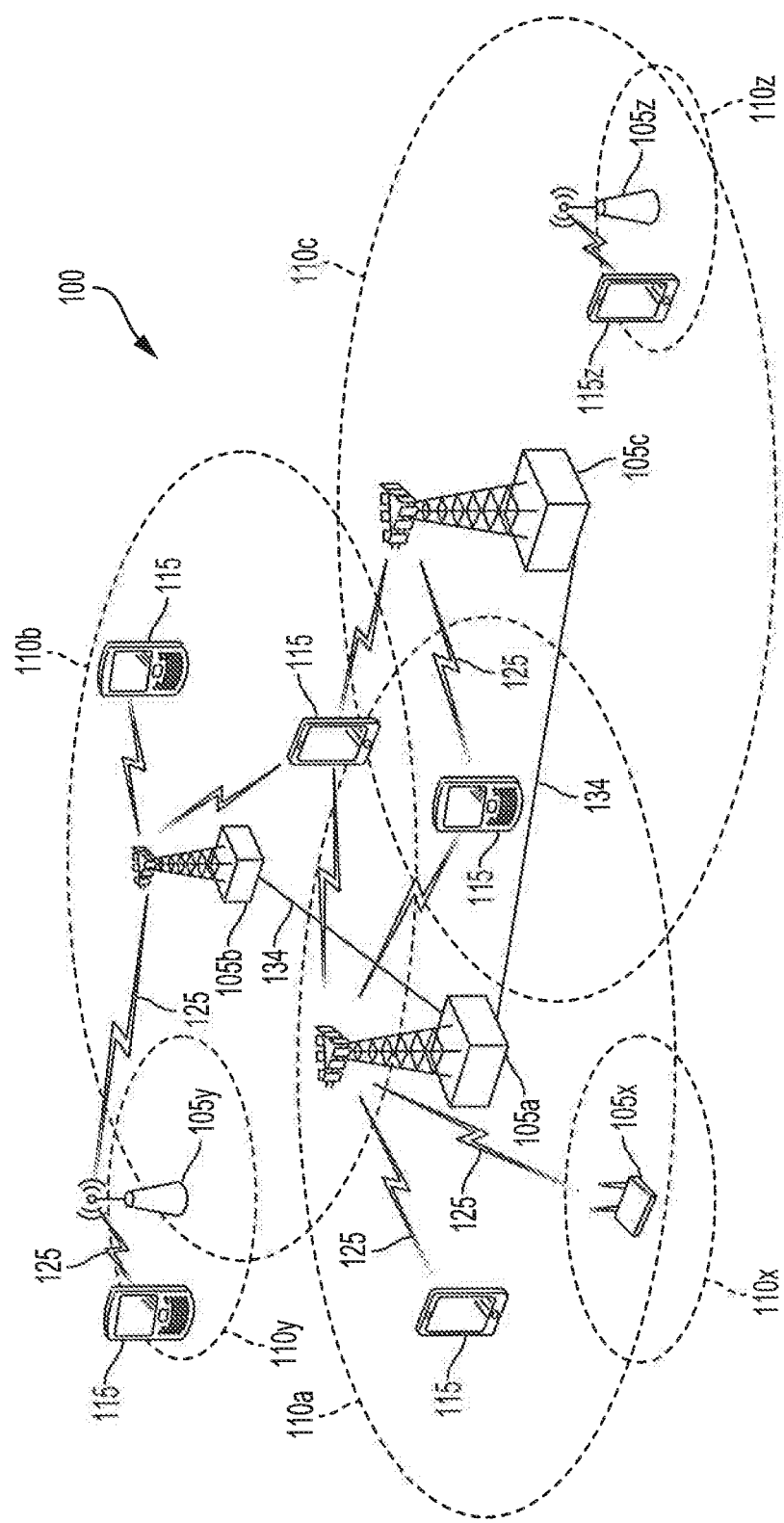
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details arc not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards, for example new radio (NR), fifth generation (5G) networks, millimeter wave (mmW) communications, etcetera.

A TDMA network may, for example implement a radio technology such as Global System for Mobile Communications (GSM), 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.), The radio access network represents a component of a GSM network, through which phone calls and packet data are routed from and to the public switched telephone network. (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATS) and radio access networks (RANs).

An OFDMA network may, for example, implement a radio technology such as evolved UTRA (E-UTRA), IEEE 802.11, IEEE 802.16, IEEE 802.20, flash-OFDM and the like, UTRA, E-UTRA, and GSM are part of universal mobile telecommunication system (UMTS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2).

These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.), While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as eNBs 105, An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively, eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time, in some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copier, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pica eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
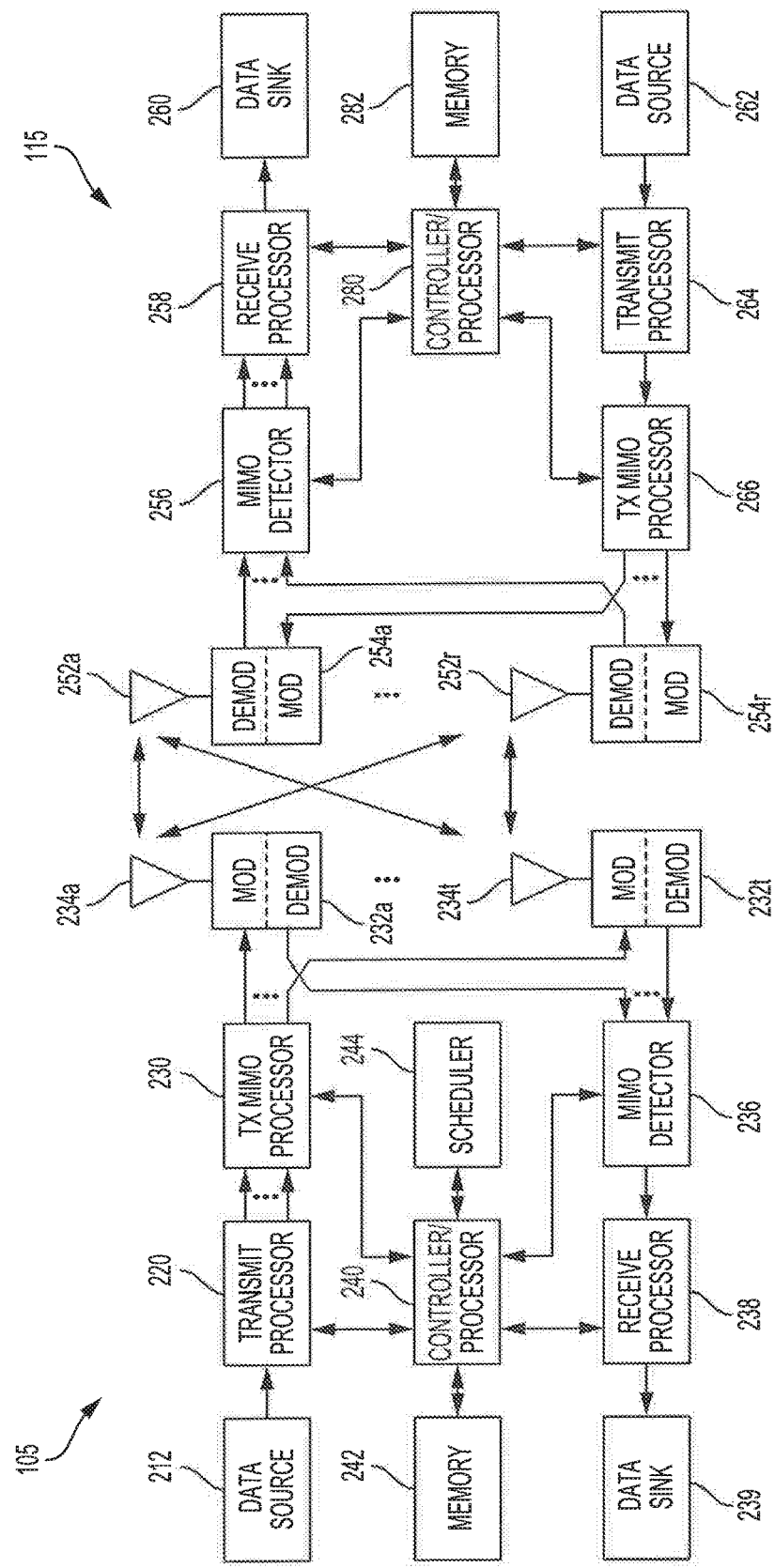
FIG. 2 is a block diagram conceptually illustrating a design of a base stationieNB and a UE configured according to some embodiments of the present disclosure.

FIG. 2 shows a block diagram of a design of base station/eNB 105 and UE 115. These can be one of the base stations/eNBs and one of the UEs in FIG. 1. For a restricted association scenario (as mentioned above), the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODS) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB 105. At eNB 105, the uplink signals from UE 115 may be received by antennas 234, processed by demodulators 232, detected by MEMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 3-9B, and/or other processes for the techniques described herein. Memories 242 and 282 may store data and program codes for eNB 105 and UE 115, respectively. Scheduler 244 may schedule UEs for data transmission on the downlink and/or uplink.

An uplink (UL) and/or downlink (DL) may be separated into frames of a predefined length (e.g., 10 milliseconds (ms)). A frame comprises a predefined number of subframes (e.g., 10 subframes that are 1 ms each). Each subframe may include a predefined number of symbols (e.g., 14 OFDM symbols), which may be mapped as resource elements (RE)s. Within each subframe, REs may be mapped such that each particular type of information is located within pre-defined REs of a subframe. This RE map may be known to both a transmitting device and a receiving device. With this pre-defined RE map, a transmitting device may locate particular types of information within that information type's predefined REs. Because specific types of information are located with predefined REs, when a receiving device receives a subframe, the receiving device may use the RE mapping to locate the specific types of information. In short, the receiving device knows where to look to find a desired type of information.

This being said, for RE mapping to be effective, it is helpful when the transmitting device and receiving device have their clocks synchronized. When the devices' clocks are synchronized, a receiving device observing a transmitted frame knows when the frame begins, when the frame ends, and when the next frames begin and end.

Synchronization Signals (SS) may be used to assist with clock synchronization. SSs may include a plurality of synchronization information, including but not limited to signaling symbol timing, signaling physical cell IDs (PCI)s, signaling master block information (MIB) to support the initial access procedures, and more.

Figure 3:
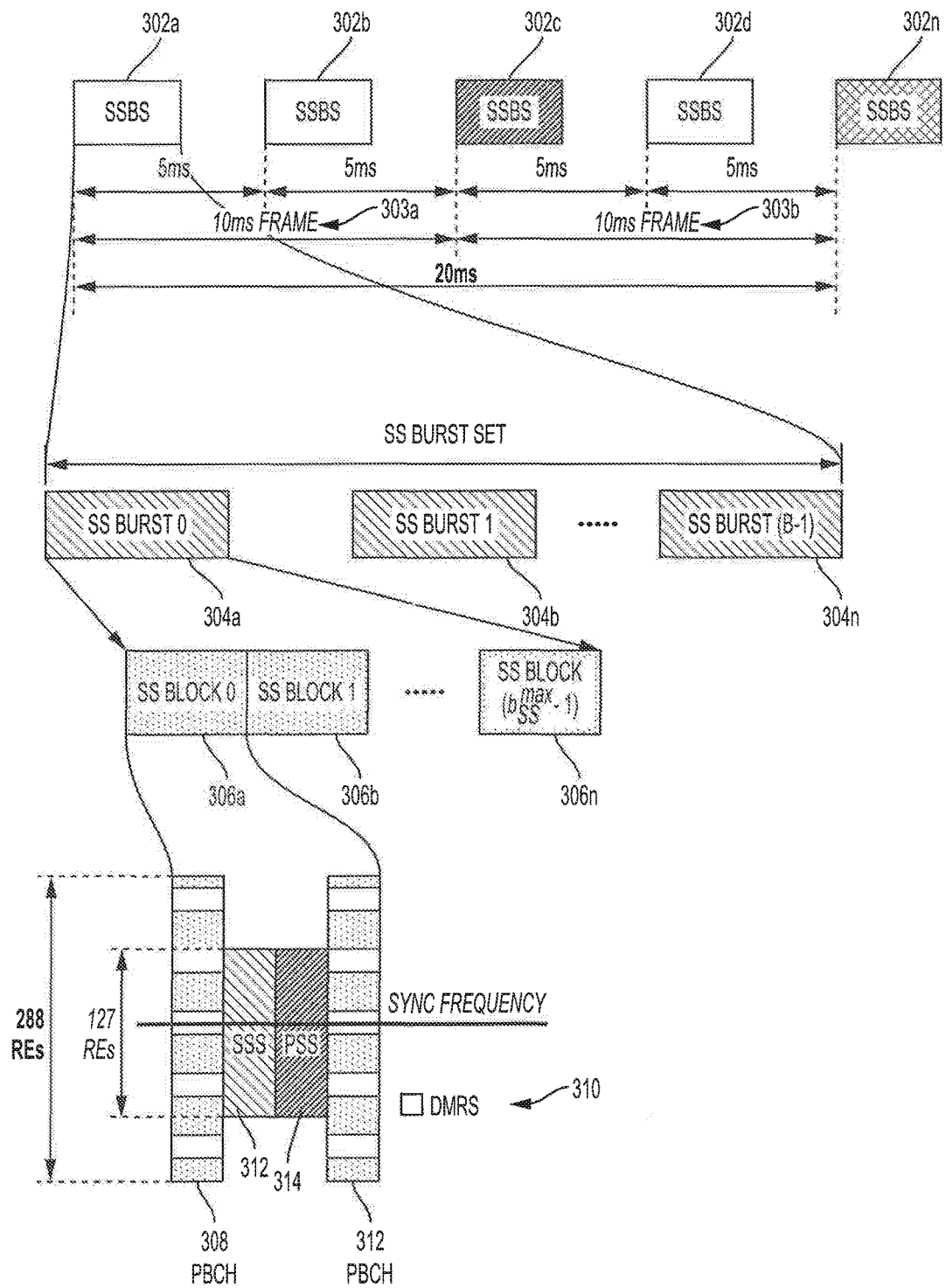
FIG. 3 is an illustration of an example frame design according to some embodiments of the present disclosure.

FIG. 3 illustrates an example embodiment of SSs. In embodiments, SSs may be communicated in a synchronization signal burst set (SSBS) 302 that comprises a plurality of synchronization signal bursts (SS burst)s 304a-304n. An SS burst may comprise one plurality of synchronization signal blocks (SS blocks 306a-306n. An SS block may comprise one or more physical broadcast channel (PBCH) 308, one or more PBCH DMRS 310, at least one primary synchronization signal (PSS) 314, and at least one a secondary synchronization signal (SSS) 312. The SSBSs may be transmitted periodically with varying periodicities. For example, SSBSs may be transmitted every 5 ms, 10 ms, and/or 20 ms. Transmitting SSBSs so frequently may be useful for UEs in an idle state (e.g., waiting to for an UL/DL) or a connected state (e.g., currently processing ULs/DLs) to enable quick synchronization acquisition and mobility procedure.

That being said, receiving SSBSs at such a high frequency may lead to increased complexity for UEs that are in an initial access state (e.g., power up state). Traditionally, these increased complexity issues were handled by configuring UEs to assume 20 ms SSBS periodicity regardless of the actual periodicity of network transmitted SSBSs. However, being that SSBSs may be transmitted at reduced periodicity (e.g., 5 ms), it would be desirable to transmit a unified SSBS and have a unified cell search procedure regardless of a SSBS's periodicity and regardless of a UE's state (e.g., initial access, idle, connected, and/or the like).

Of particular interest to UEs in an initial access state is PBCH 308 and/or PBCH 312. Example PBCH 308/312 conveys a Master Information Block (MIB) comprising some or all of a frame's System Frame Number (SFN). The SFN indicates to the UE the current number of the frame (e.g., frame number 0 to 1024). Identifying the current frame number is of particular importance to a UE in the initial access state because identifying the current frame number may be used to synchronize the UE's clock with the transmitting device's clock.

In embodiments, the MIB of PBCH 308/312 may include some but not all of the SFN. For example, the MIB may include the most significant bits (MSB)s of the SFN but not the less significant bits (LSB)s. In embodiments wherein the LSBs SFN are not a part of the MIB, these less significant bits may be signaled in a PBCH redundancy version (RV). Having the LSBs of SFN in PBCH RVs within a broadcast channel transmission time interval (BCH-TTI) enables a UE to soft-combine PBCH when decoding PBCH. In terms of bits, an SFN may be of a predefined size (e.g., 10 bits). The most significant bits may be k bits (e.g., k=7 bits). The number of less significant bits would then be: LSBs=10 bits−k bits (e.g., 10 bits−7 bit=3 LSBs). The most significant bits (e.g., the 7 most significant bits) may be transmitted in the MIB of PBCH 308/312, and the less significant bits (e.g., the 3 less significant bits) may be transmitted in one or more PBCH RVs.

Because the MIB omits some of the SFN, a UE in the initial access state may blindly decode the PBCH to derive the LSBs of SFN signaled in PBCH RVs. For instance, when a UE decodes the MIB of PBCH 308/312, the most significant bits (MSB)s of SFN are available for decoding. The UE may be able to narrow the SFN down to one of a group of SFNs. However, the initial access UE may resort to other processing schemes to determine the less significant bits and identify the exact SFN. In embodiments, to accurately determine the SFN, the initial access UE may blind decode the less significant bits. As an example, if the MIB omits 3 LSBs, the may UE hypothesize that the less significant bits could be one of several possible iterations. Further, UE may not know the BCH-TTI boundary when decoding PBCH. In designs, all 8 PBCH RVs correspond to 8 PBCH transmissions. UE may test over multiple BCH-TTI boundary hypotheses and combine PBCH across 8 PBCH transmissions. The correct BCH boundary is detected when PBCH is decoded successfully.

In an example having 8 PBCH RVs, UE can have 8 different boundary hypotheses:
- {0, 1, 2, 3, 4, 5, 6, 7} for an example having 8 PBCH RVs 0-7 from the same BCH-TTI;
- {7, 0, 1, 2, 3, 4, 5, 6} for an example having PBCH RV 7 from the previous BCH-TTI and PBCH RVs 0-6 from the current BCH-TTI;
- {6, 7, 0, 1, 2, 3, 4, 5} for PBCH RVs 6-7 from the previous BCH-TTI and PBCH RVs 0-5 from the current PBCH-TTI
- {5, 6, 7, 0, 1, 2, 3, 4} for PBCH RVs 5-7 from the previous BCH-TTI and PBCH RVs 0-4 from the current PBCH-TTI
- {4, 5, 6, 7, 0, 1, 2, 3} for PBCH RVs 4-7 from the previous BCH-TTI and PBCH RVs 0-3 from the current PBCH-TTI
- {3, 4, 5, 6, 7, 0, 1, 2} for PBCH RVs 3-7 from the previous BCH-TTI and PBCH RVs 0-2 from the current PBCH-TTI {2, 3, 4, 5, 6, 7, 0, 1} for PBCH RVs 2-7 from the previous BCH-TTI and PBCH RVs 0-1 from the current PBCH-TTI {1, 2, 3, 4, 5, 6, 7, 0} for PBCH RVs 1-7 from the previous BCH-TTI and PBCH RV 0 from the current PBCH-TTI When combining 8 PBCH RVs, UE may observe more than 8 PBCH transmissions (e.g., 15) and then apply a sliding window to combine PBCH transmissions.

Blind decoding 8 different boundary hypotheses is complex, time demanding, and resource consuming. This complexity may be reduced by defining (or designating) frames within a group of frames as being odd frames or even frames. With the frames designated as being odd or even, the transmitting device may send a one-bit information signal indicating to the UE whether the presently received PBCH is included within an odd frame or an even frame of the group of frames. Frame designations coupled with the one-bit signaling reduces the complexity associated with a UE determining a SFN.

Figure 4:
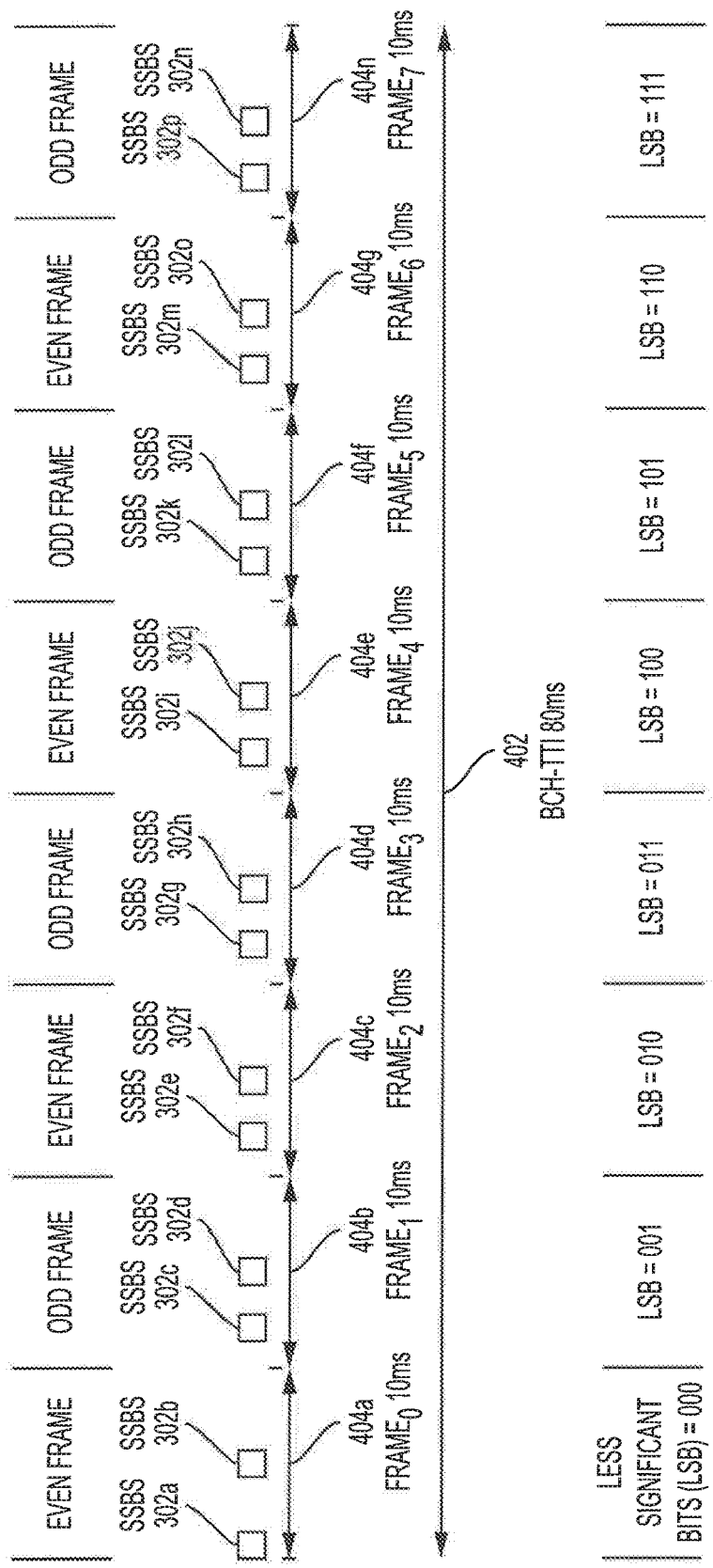
FIG. 4 is another illustration of an example frame design according to some embodiments of the present disclosure.

FIG. 4 illustrates an example wherein 3 less significant bits (LSB)s of the SFN are omitted from the MIB. In examples, the LSBs may be transmitted within the PBCH RVs of an SSBS. Because there are 3 LSBs to be transmitted with PBCH RYs, 8 different PBCH RVs will effectively transmit the 3 iterations identified by 3 bits (e.g., LSB=000, 001, 010, 0011, 100, 101, 110, or 111). In embodiments, the group of frames may be defined as the frames included within a broadcast channel transmission time interval (BCH-TTI) 402. BCH-TTI 402 may have a predefined length (e.g., 80 ms) know to the transmitting device and the UE. Further, BCH-TTI 402 may be predefined to start at the beginning of a frame. Because frames 404a-404n of this example are 10 ms long, BCH-TTI 402 comprises 8 frames, each respectively having a unique SFN. Within a frame, the PBCH may be transmitted a plurality of times within a plurality of SS blocks, That being said, within a frame, the PBCH RYs, which carry the LSBs, may all be identical.

As explained above, designating alternative frames within a group of frames (e.g., as being even frames or odd frames) may reduce the complexity of determining the full SFN. The network may define which frames a BCH-TTI are even frames and which frames are odd frames. For example, the network may define the first frame of a BCH-TTI as being an even frame and alternate the designation of each frame thereafter. In embodiments, the transmitting device and UE may know the designation of the first frame of a BCH-TTI, and thus the designation of each following frame of a BCH-TTI.

Figure 5:
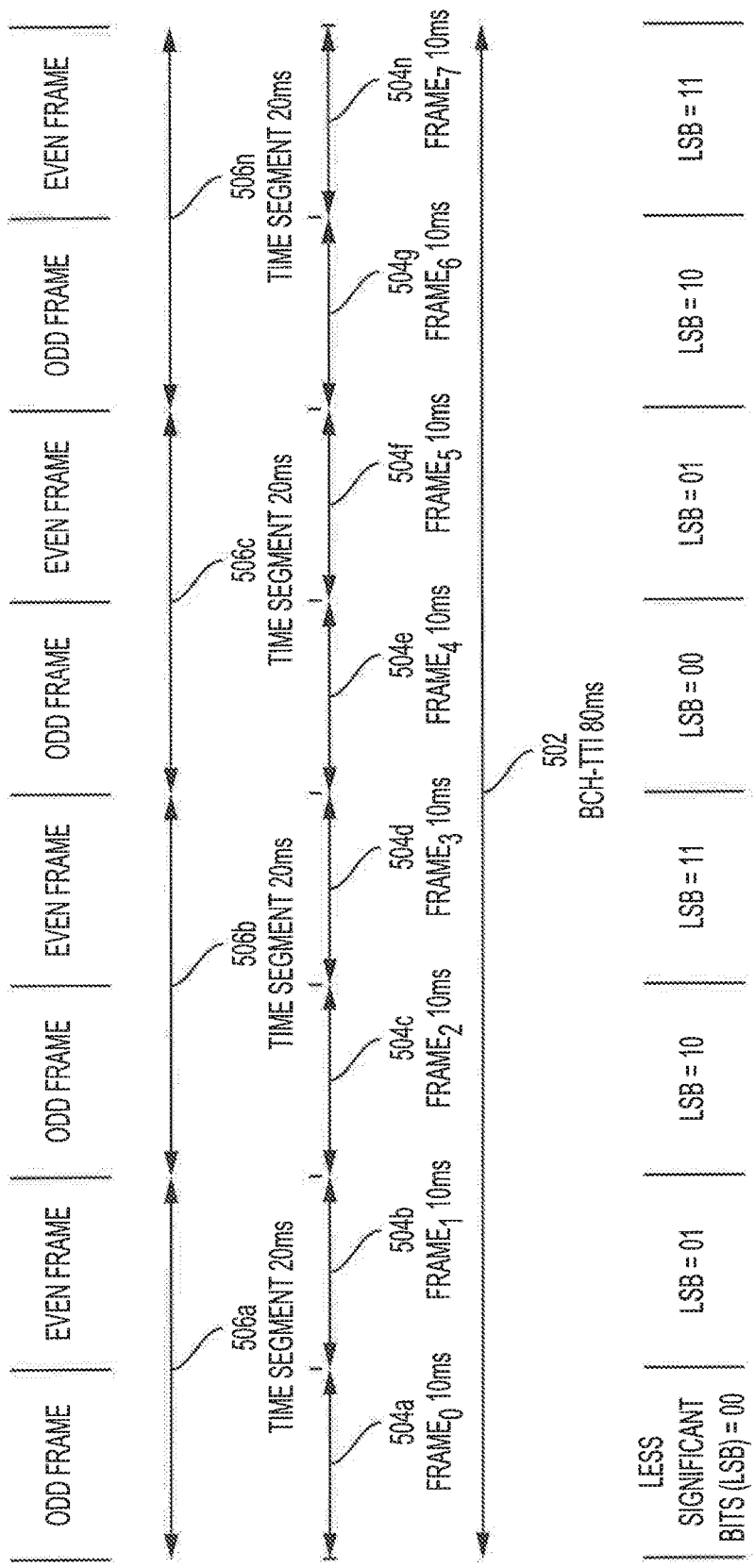
FIG. 5 is another illustration of an example frame design according to some embodiments of the present disclosure.

In the example of FIG. 4, first frame 404a is defined as being an even frame. Each frame thereafter is alternatingly defined as being even or odd. For instance, frames 404a, 404c, 404e, and 404g are designated even frames and frames 404b, 404d, 404f, and 404n are designated as odd frames. Of course the designation of even and odd can be reversed if desired as is illustrated in FIG. 5. And in still other embodiments, other types of non-binary designations may be used.

In FIG. 4, a UE may begin initial access routines at any time during Be 402. For example, a user may power up a UE at any time within the 80 ms of BCH-TTI 402. As such, a UE may receive any frame 404a-404n of BCH-TTI 402 as its first received frame. Further, the UE may receive any SSBSs 302a-302n as its first SSBS.

An initial access UE may not immediately know which frame it received, so the UE decodes the MIB of one or more PBCH of the SSBS of the frame it received to determine the received frame's SEN. Yet the SFN of the received frame only includes the most significant bits of the SFN (e.g., 7 of 10 bits). As described above, the less significant bits (e.g., 3 bits) are omitted from MIB and instead included within a PBCH RV. The UE may start by decoding the most significant bits (MSB)s of the SFN. With the MSBs decoded, the UE may determine that the SEN identifies one of frames 404a-404n. To reduce complexity at the UE, the SSBS of the frame the UE received indicates whether the frame is an even frame or an odd frame. In this example, the UE received an odd frame, and the SSBS indicates as such. Because in this example the UE knows that the first frame of a BCH-TTI is an even frame, the UE uses the SSBS's indication that the received frame is an odd frame to determine that the received frame is one of frames 404b (e.g., iteration 001), 404d (e.g., iteration 011), 404f (e.g., iteration 101), and 404n (e.g., iteration 111). At this point, the UE resorts to blind decoding to determine which of the four possible frames the UE received.

In the example of FIG. 4, designating the frames as being even frames or odd frames and signaling a frame's even/odd designation reduces the UE's blind decoding from eight iterations, as discussed in FIG. 3, to four iterations. As such, the example of FIG. 4 reduced the complexity at the UE by half as compared to the example discussed in FIG. 3. Further systems and methods may reduce complexity at the UE even further, by reducing the amount of less significant bits (LSB) as is shown by way of example in FIG. 5.

FIG. 5 illustrates an example wherein 2 less significant bits (LSB) of the SFN are omitted from the MIB. In examples, the LSBs may be transmitted within the PBCH RVs of an SSBS. With 2 LSBs, 4 different PBCH RVs may effectively transmit the 4 iterations identified by the 2 LSBs LSB=00, 01, 10, or 11). In embodiments, the group of frames it designated as BCH-TTI 502, which may be predefined as being 80 ms and predefined as starting at the beginning of a frame. Because a frame is 10 ms long, BCH-TTI 402 comprises 8 frames, 504a-504n, each having a unique SFN. Because as few as 4 different PBCH RVs may be used to effectively transmit all the LSBs of this example, BCH-TTI 502 may be organized into 4 time segments 506a-506n of a predefined length (e.g., 20 ms). Within a frame, the PBCHs of the frame, and the MIB therein, may be transmitted a plurality of times within a plurality of SS blocks. Within time segments 506a-506n, the PBCH RVs, which carry the LSBs, may all be identical.

A network may define the first frame of a BCH-TTI as being an even frame or an odd fame. In this example, first frame 504a of BBCH-TTI 502 is defined as being an odd frame and each frame thereafter is alternatingly defined as being even or odd. The transmitting device and the UP have pre-knowledge of the first frame's designation. In this example, frames 504a, 504c, 504e, and 504g are designated odd frames and frames 504b, 504d, 504f, and 504n are designated as even frames. Of course the designation of even and odd can be reversed if desired as is illustrated in FIG. 4.

In FIG. 5, a UP may begin initial access routines at any time during BCH-TTI 502. For example, a user may power up a UP at any time within the 80 ms of BCH-TTI 502. A UP in initialization may receive any frame 504a-504n of BCH-TTI 502 as its first received frame and may receive any SSBSs 302a-302n as its first SSBS.

But an initial-access UE may not immediately know which frame it received. So the UE decodes the MIB of one or more PBCH of the SSBS of the frame it received to determine the received frame's SFN. Yet the SFN of the received frame only includes the most significant bits of the SFN (e.g., 8 of 10 bits). The UE may start by decoding the most significant bits (MSB)s of the SFN, With the MSBs decoded, the UP may determine that the SFN identifies of one of four frames (e.g., 504a-504d). That being said, to reduce complexity at the UP, the SSBS of the frame the UE received indicates whether the frame is an even frame or an odd frame. In this example, the UE received an even frame, and the SSBS indicates as such. Because in this example the network designated the first frame as being an odd frame, the UE uses the even frame indication to determine that the received frame is one of frame 504b (e.g., iteration 01) and 504d (e.g., iteration 11). At this point, the UE may resort to blind decoding to determine which of the two possible frames the UE received.

In the example of FIG. 5, reducing the LSBs omitted from the MIB to 2 bits, designating the frames as being even frames or odd frames, and signaling a frame's even/odd designation reduces the UE's blind decoding from four iterations, as described in FIG. 4 to two iterations. As such, this example reduced the complexity at the UE by even further as compared to the example of FIG. 4.

As explained above, a frame's even/odd designation may be signaled in the respective frame's SSBSs. Embodiments herein support various systems and methods of signaling a frame's even/odd designation.

In embodiments, the even/odd designation may be signaled in a PBCH's demodulation reference signals (DMRS) s, which may also include pilot information and demodulation information used to decode symbols that follow DMRS. For instance, a SS block's first PBCH may comprise DMRS-1 and the SS block's second PBCH may comprise DMRS-2. In embodiments, DMRS-1 may be orthogonal (or pseudo-orthogonal) to DMRS-2 and the sequence of DMRS-1 and DMRS-2 are known by the transmitting device and the UE.

Figure 6A:
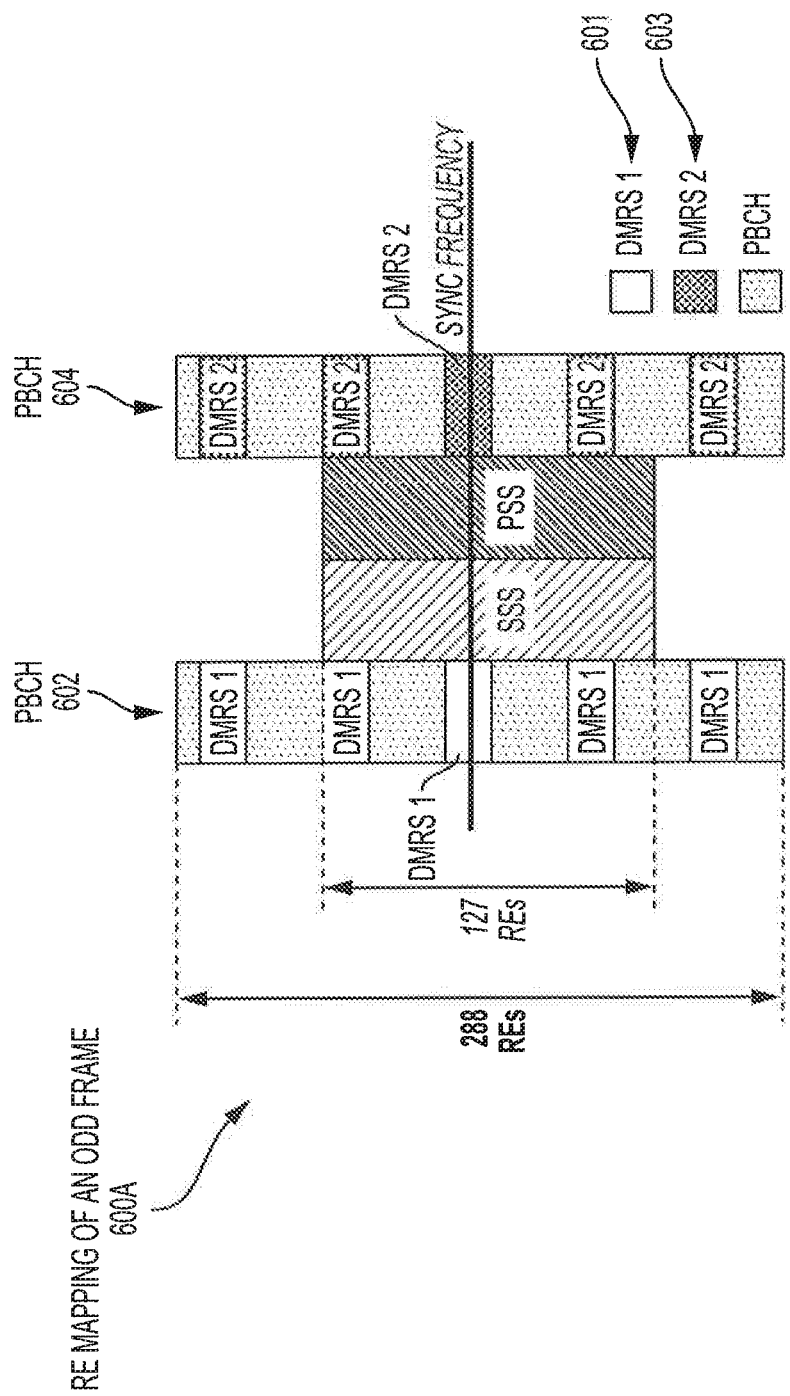
FIG. 6A is an illustration of an example resource element mapping according to some embodiments of the present disclosure.
Figure 6B:
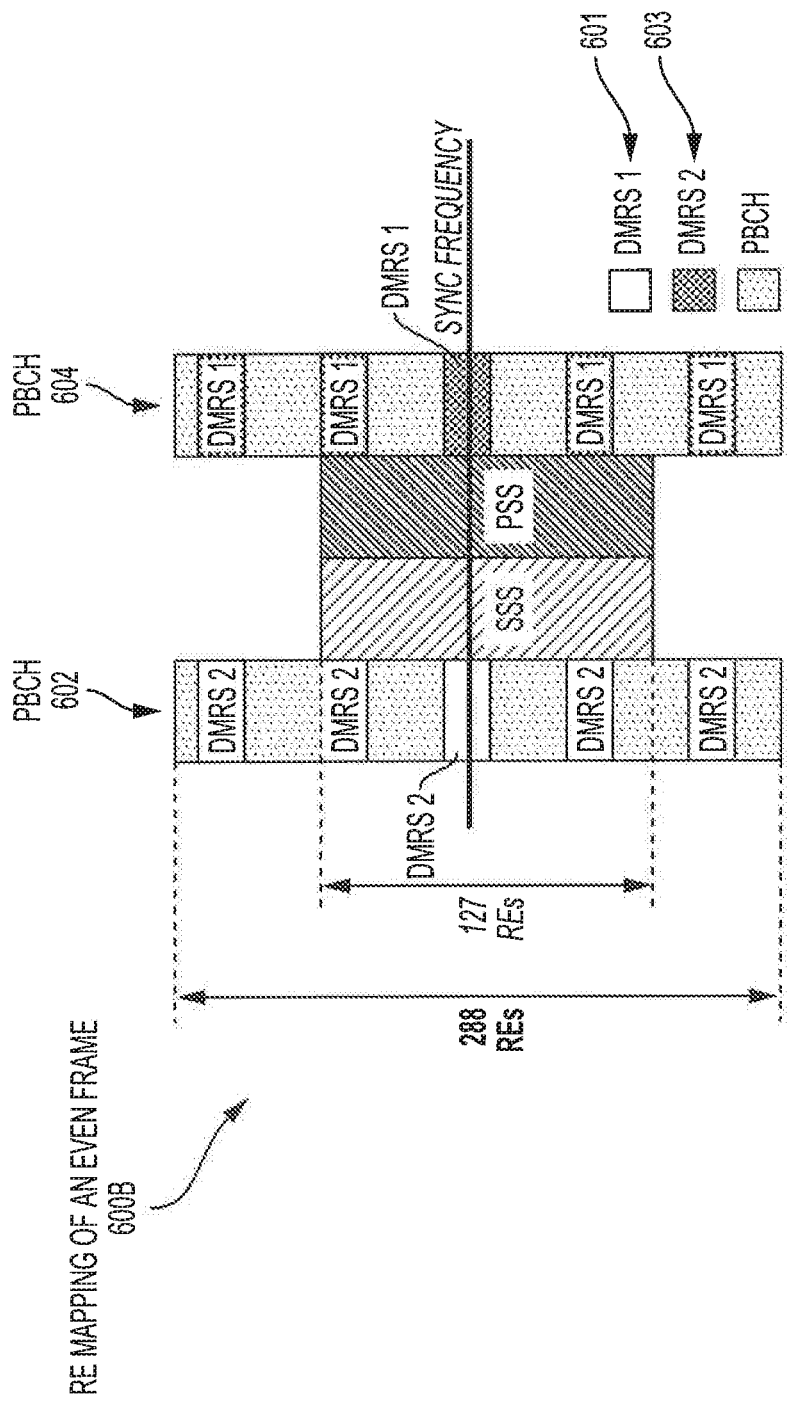
FIG. 6B is another illustration of an example resource element mapping according to some embodiments of the present disclosure.

FIGS. 6A and 6B show an example RE mapping configuration wherein the transmitting device and the UE may be configured to identify frames having DMRS-1 601 in the first PBCH 602 and having DMRS-2 603 in the second PBCH 604 as being odd frames. Further, the transmitting device and the UE may be configured to identify frames having DMRS-2 603 in the first PBCH and having DMRS-1 601 in the second PBCH as being even frames.

Figure 7A:
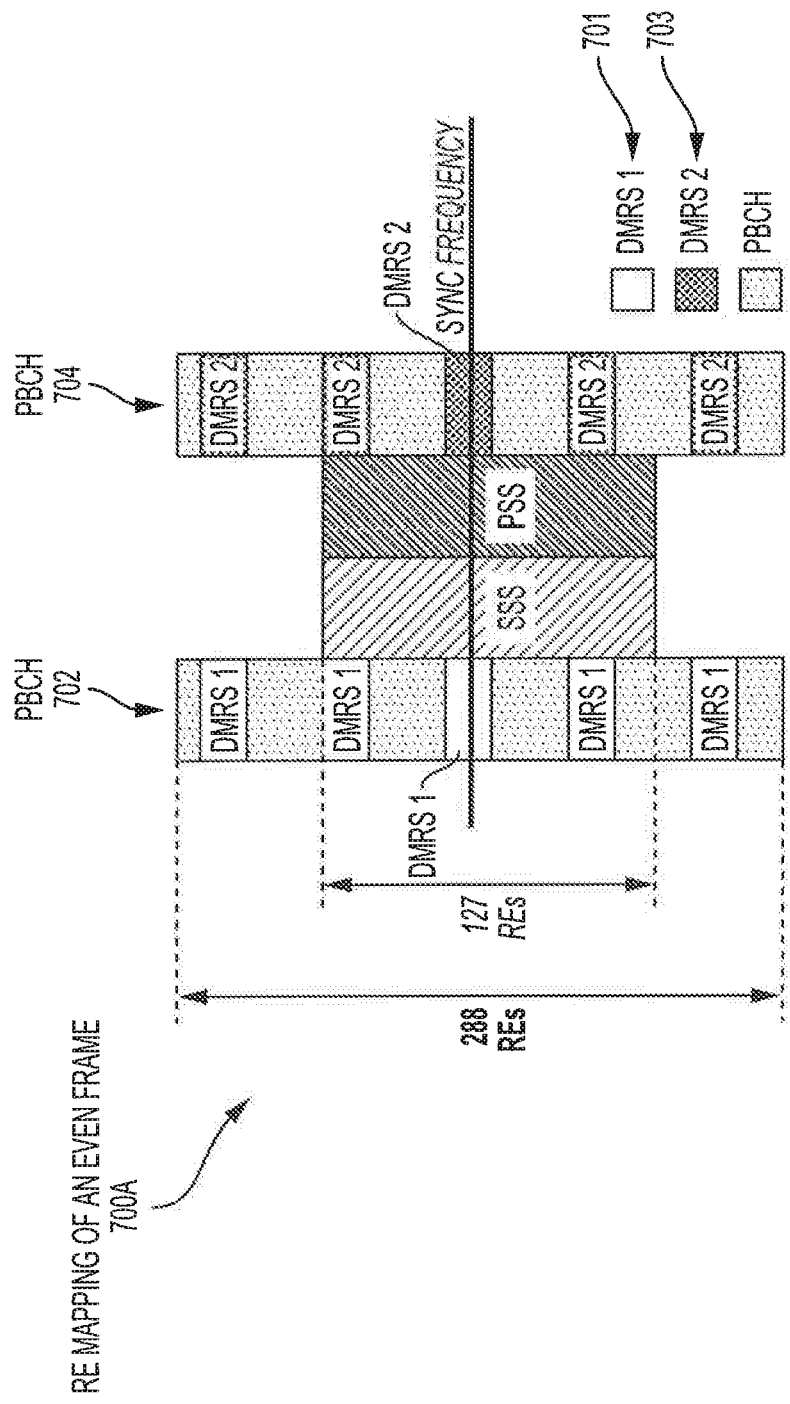
FIG. 7A is another illustration of an example resource element mapping according to some embodiments of the present disclosure.
Figure 7B:
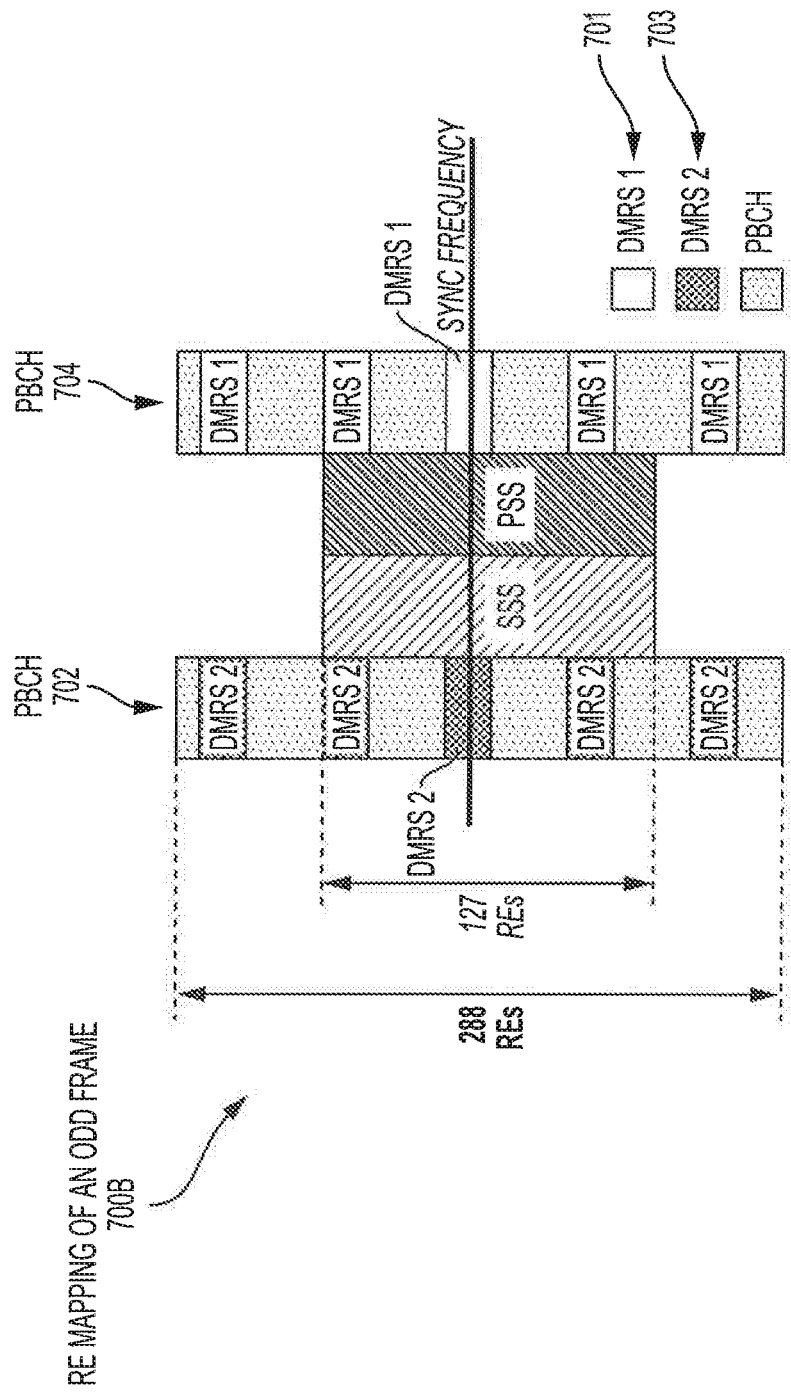
FIG. 7B is another illustration of an example resource element mapping according to some embodiments of the present disclosure.

FIGS. 7A and 7B show an example frame mapping configuration wherein the transmitting device and UE may be configured to identify frames having DMRS-1 701 in the first PBCH 702 and having DMRS-2 703 in the second PBCH 704 as being even frames. Further, the transmitting device and the UE may be configured to identify frames having DMRS-2 703 in the first PBCH 702 and having DMRS-1 701 in the second PBCH 704 as being odd frames.

Figure 8A:
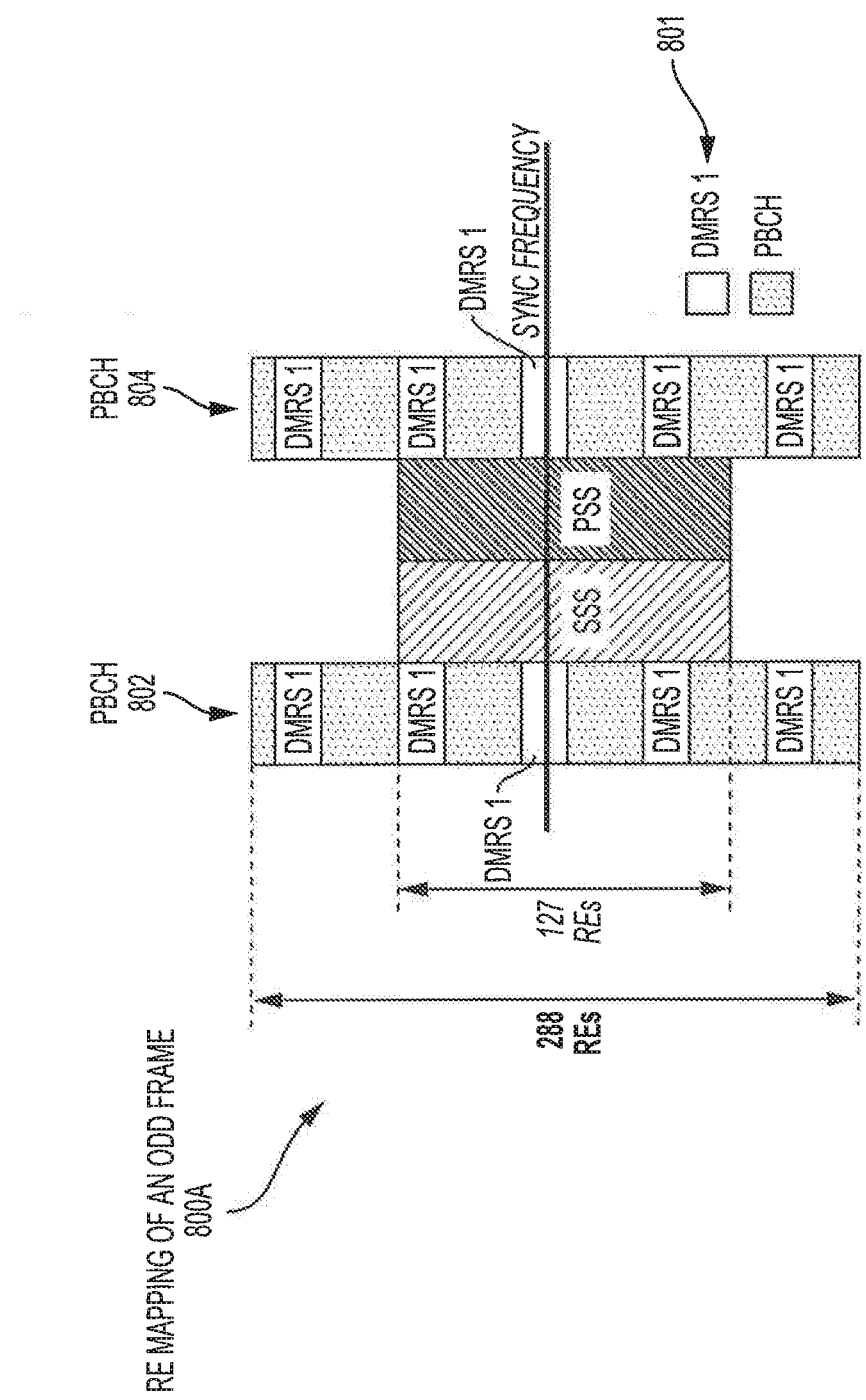
FIG. 8A is another illustration of an example resource element mapping according to some embodiments of the present disclosure.
Figure 8B:
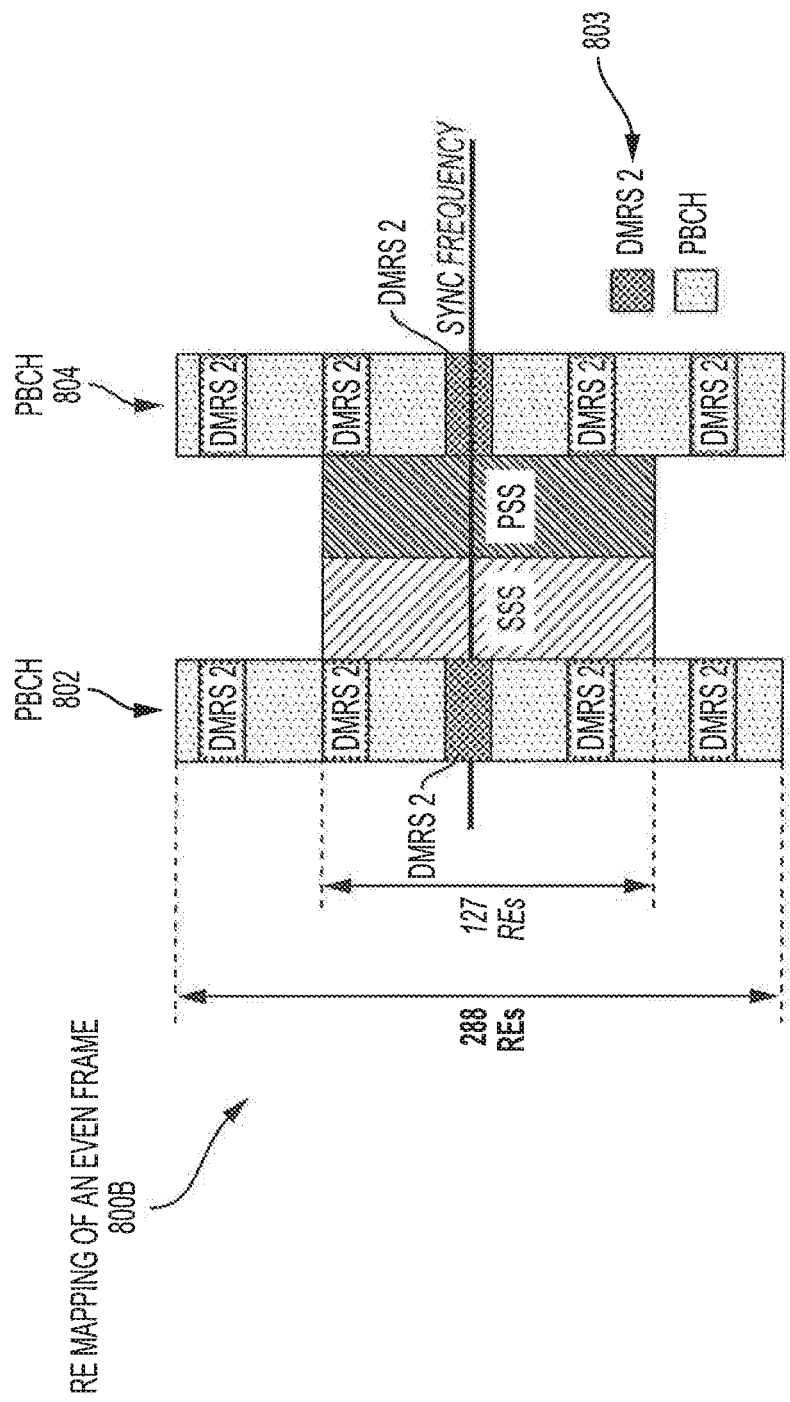
FIG. 8B is another illustration of an example resource element mapping according to some embodiments of the present disclosure.

In another example shown in FIGS. 8A and 8B, the transmitting device and the UE may be configured to identify frames having DMRS-1 801 in the first PBCH 802 and DMRS-1 in the second PBCH 804 as being odd frames. Further, the transmitting device and the UE may be configured to identify frames having DMRS-2 803 in the first PBCH 802 and DMRS-2 803 in the second PBCH 804 as being even frames.

Figure 9A:
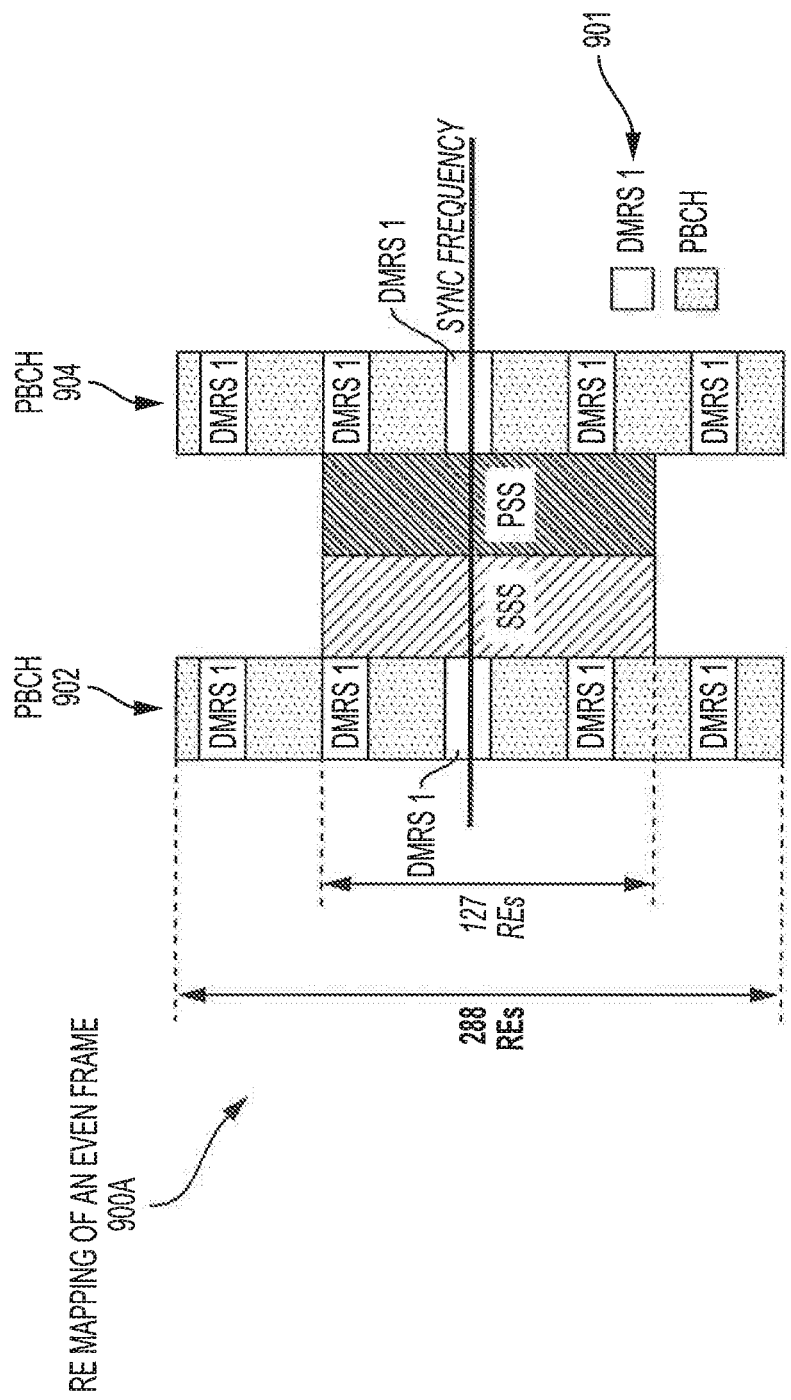
FIG. 9A is another illustration of an example resource element mapping according to some embodiments of the present disclosure.
Figure 9B:
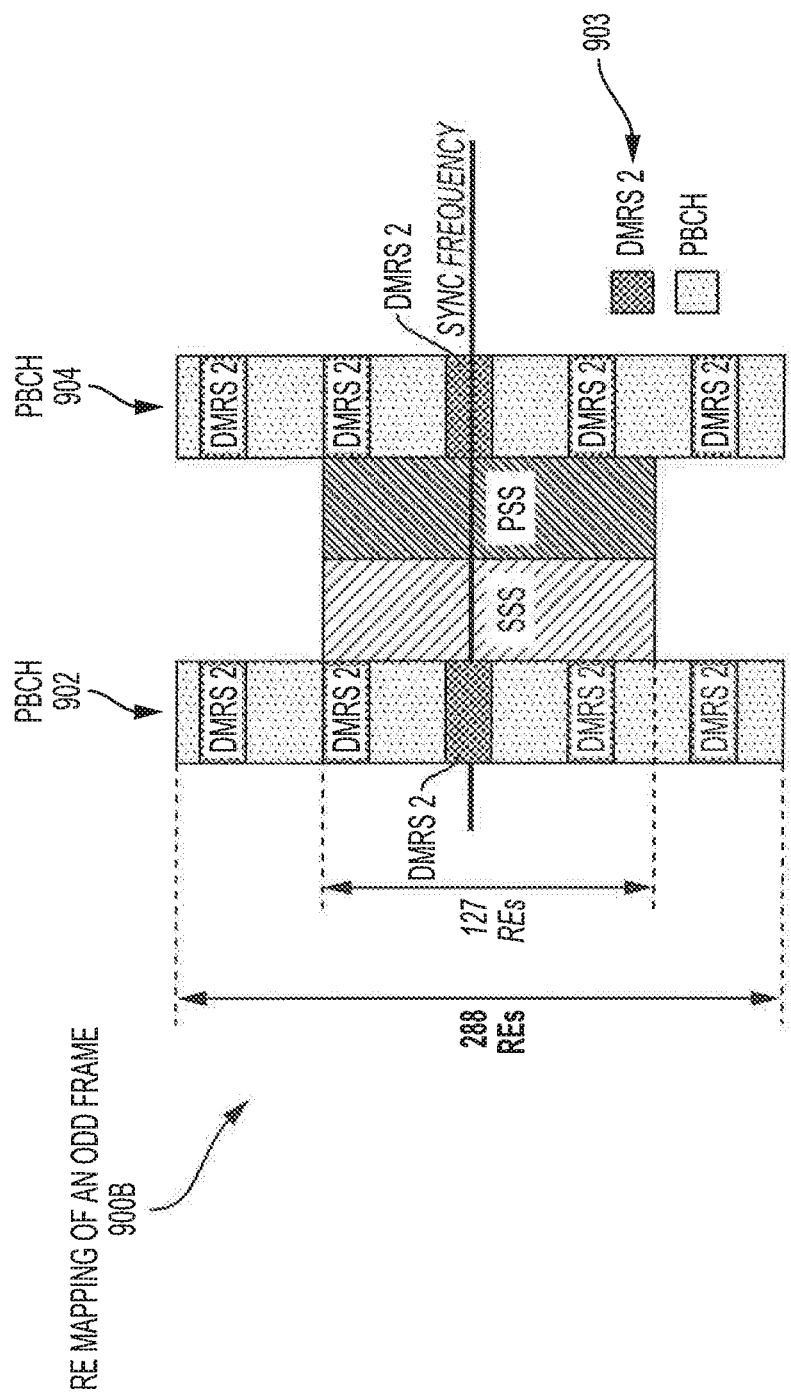
FIG. 9B is another illustration of an example resource element mapping according to some embodiments of the present disclosure.

In yet example shown FIGS. 9A and 9B, the transmitting device and the UE may be configured to identify frames having DMRS-1 901 in the first PBCH 902 and DMRS-1 in the second PBCH 904 as being even frames. Further, the transmitting device and the UE may be configured to identify frames having DMRS-2 903 in the first PBCH 902 and DMRS-2 903 in the second PBCH 804 as being odd frames. In short, the network may be configured such that the transmitting device and the UE may identify a frame as being even or odd based at least on a value of one or more DMRS and its location within one or more PBCH.

Additionally or alternative, the even/odd designation may be signaled in an SSBS's PSS and/or SSS. In embodiments, a PSS and SSS may be sent over the same antenna port or same antenna ports. Further, odd frames may be indicated when transmitting device sends a +PPS and SSS, and even frames may be indicated when the transmitting device sends a −PPS and SSS. Alternatively, even frames may be indicated when the transmitting device sends a +PPS and SSS, and odd frames may be indicated when the transmitting device sends a −PPS and SSS. Further, odd frames may be indicated when the transmitting device sends a PPS and +SSS, and even frames may be indicated when the transmitting device sends a PPS and −SSS. Alternatively, odd frames may be indicated when the transmitting device sends a PPS and +SSS, and even frames may be indicated when the transmitting device sends a PPS and −SSS.

A UE may detect this example one-bit information (e.g., + and/or −) by computing the difference in channel estimates based on PPS and SSS. The UE may compare the two channels to determine which of the two channels is not the same. The channel that is not the same may be considered the negative channel. Further, the bit information is only one-bit because the system assumes the value is +(positive) and only adds a bit when the value is −(negative).

In embodiments, as explained above, the less significant bits (LSB)s may be included in a PBCH redundancy version (RV). Additionally or alternatively, the LSBs of a SFN may be included elsewhere. For example, LSBs of a SFN may be included in a PBCH DMRS and/or an SSS. In embodiments, all the LSBs omitted from the MIB may be included in one or more PBCH DMRS of a SS block. Such a configuration may result in having a single PBCH RV per PBCH. Further, such a configuration may not designate frames as being even frames or odd frames because blind decoding of the LSBs is not a concern. A UE will decode the DMRS regardless of the information therein, so including the LSBs of the SFN in a DMRS alleviates a UE from resorting to blind decoding.

In another example, some of the LSBs of the SFN may be included within the PBCH DMRS and some of the LSBs of the SFN may be included within the SSS. Similar to the example above, such a configuration may result in having a single PBCH RV per PBCH. Further, such a configuration may not designate frames as being even frames or odd frames because blind decoding of the LSBs is not a concern. A UE will decode the PBCH DMRS and the SSS regardless of the information therein, so splitting the LSBs of the SFN in the PBCH DMRS and SSS alleviates a UE from resorting to blind decoding.

In other embodiments, some SSBSs may be designated as supporting initial access UEs while other SSBSs may be designated as supporting idle state and/or connected UEs. In embodiments, initial access SSBSs may be transmitted one every 20 ms, while idle/connected SSBSs may be transmitted every 5 ms, 10 ms, 15 ms, 20 ms, 40 ms, 80 ms, 160 ms and the like. A transmitting device (and/or the network) may adjust the transmission frequency of initial access SSBSs and/or idle/connected SSBSs based on dynamic parameters. In addition, there may be some frequency and/or timing offset between initial access SSBSs and idle/connected SSBSs, in embodiments, an SSBS's designation as being an initial access SSBS and/or idle/connected SSBS may be indicated via a distinctive multiplexing. For example, an initial access PBCH of an SSBS may be multiplexed according to a first multiplexing scheme, while a connected/idle PBCH of an SSBS may be multiplexed according to a second multiplexing scheme. The first and second multiplexing schemes may be selected by the network and made known to the transmitting device and the UE.

In an example, when the transmitting device is generating a SSBS for transmission, the transmitting device may determine whether the SSBS is for supporting initial access UEs and/or supporting idle/connected UEs. Based on the determination, the transmitting device may select the respective multiplexing scheme that matches the SSBS's intended support and multiplex the PBCH of the SSBS according to the selected multiplexing scheme. Thereafter, the SSBS may be included within a frame and transmitted by the transmitting device at an appropriate time (e.g., 5 ms or 10 ms for idle/connected SSBSs and 20 ms for initial access SSBSs).

In another example, a UE may receive the frame and detect an SSBS of the frame. At first, the UE may not detect whether the SSBS is for initial access support and/or for idle/connected support. For instance, the UE may decode the SSS of the SSBS, and based at least one the SSS decoding, the UE may detect the SSBS type of support (e.g., initial access support and/or idle/connection support).

Figure 10:
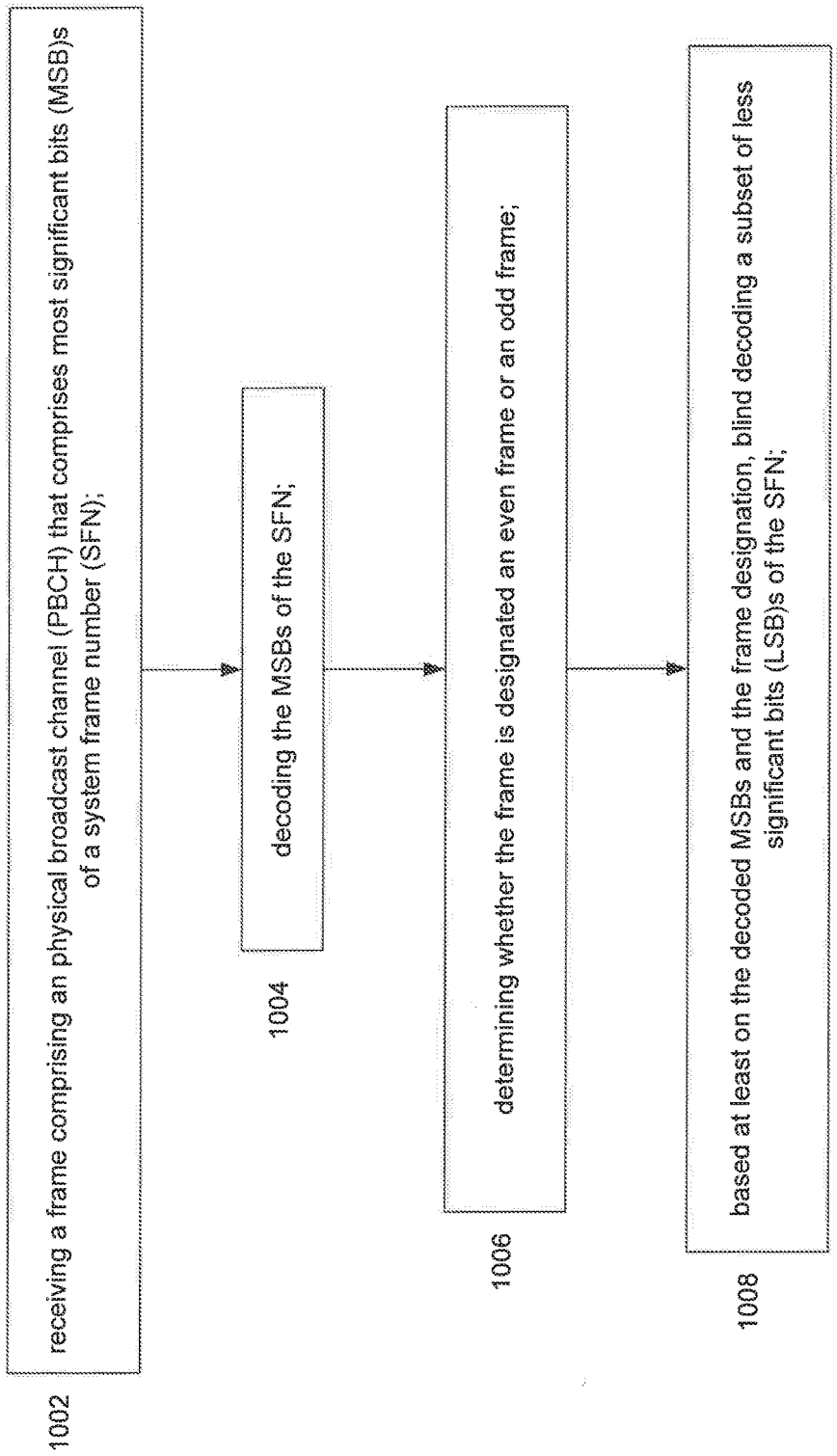
FIG. 10 is an example method according to some embodiments of the present disclosure.

FIG. 10 is an example method according to embodiments discussed above. The example method of FIG. 10 determines a system frame number (SFN). In step 1002, a device (e.g., UE) receives a frame comprising an physical broadcast channel (PBCH) that comprises most significant bits (MSB)s of a system frame number (SFN), In step 1004, the method decodes the MSBs of the SFN. In step 1006, the method determines whether the frame is designated an even frame or an odd frame, Step 1008 of the method blind decodes a subset of less significant bits (LSB)s of the SEN. The blind decoding of step 1008 may be based at least on the decoded. MSBs and the frame designation.

Figure 11:
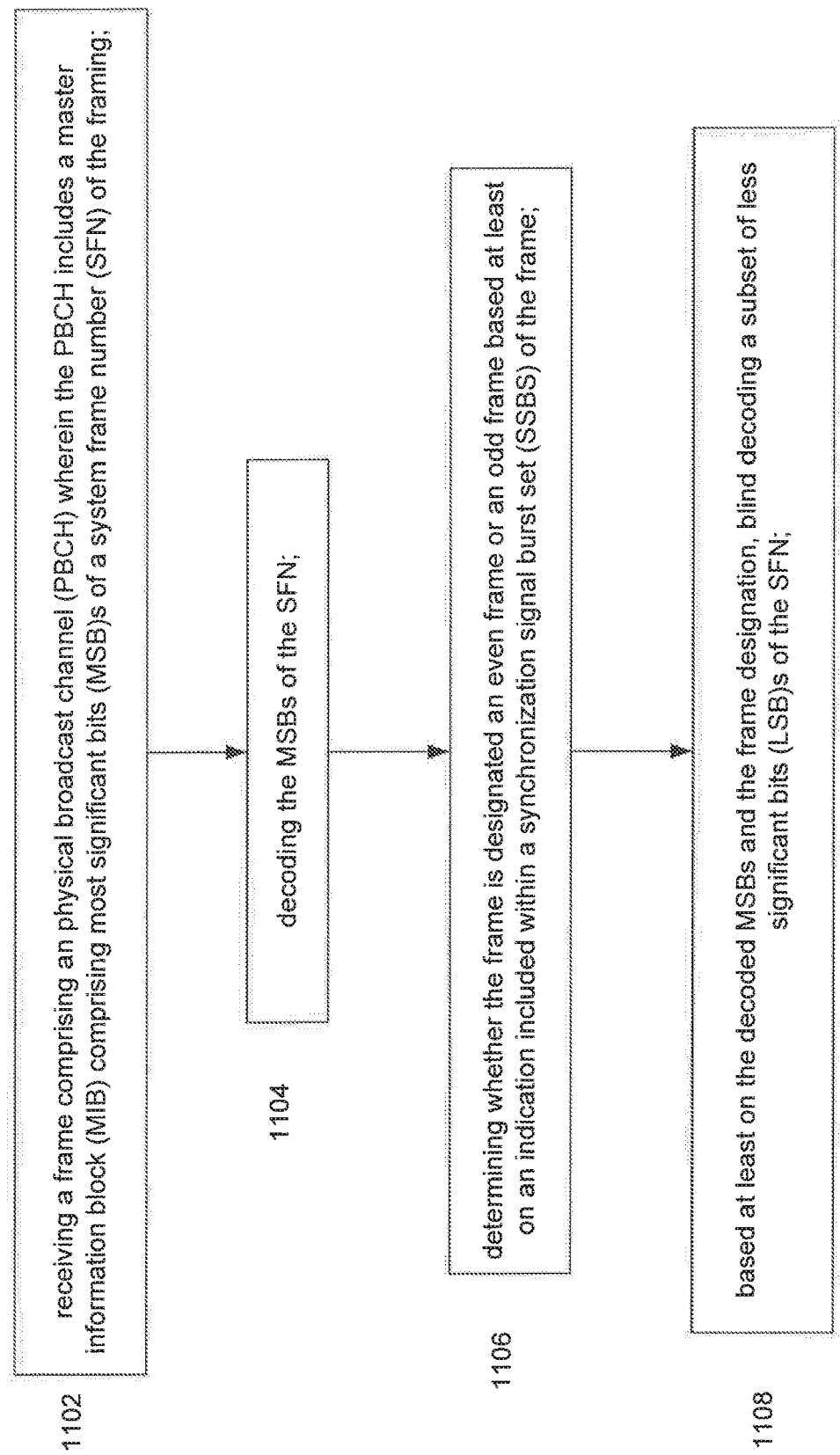
FIG. 11 is another example method according to some embodiments of the present disclosure.

FIG. 11 is an example method according to embodiments discussed above. The example method of FIG. 11 determines a system frame number (SFN). In step 1102, a device (e.g., UB) receives a frame comprising an physical broadcast channel (PBCH). The PBCH may include a master information block (MIB) comprising most significant bits (MSB)s of a system frame number (SFN) of the frame. In step 1104, the method decodes the MSBs of the SFN. In step 1106, the method determines whether the frame is designated an even frame or an odd frame based at least on an indication included within a synchronization signal burst set (SSBS) of the frame. Step 1108 of the method blind decodes a subset of less significant bits (LSB)s of the SEN to determine which of the subset of the LSBs are part of the SFN, The blind decoding of step 1108 may be based at least on the decoded MSBs and the frame designation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality, Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   receiving, by a user equipment (UE), a frame comprising a physical broadcast channel (PBCH), wherein the PBCH includes a master information block (MIB) comprising most significant bits (MSB)s of a system frame number (SFN) of the frame;
   decoding the MSBs of the SFN;
   determining whether the frame is designated an even frame or an odd frame based at least on an indication included within a synchronization signal burst set (SSBS) of the frame; and
   based at least on the decoded MSBs and the frame designation, blind decoding a subset of less significant bits (LSB)s of the SFN to determine which of the subset of the LSBs are part of the SFN.

2. The method of claim 1 wherein the indication is signaled within one or more PBCH demodulated reference signal (DMRS).

3. The method of claim 2 wherein the indication is signaled by a first DMRS being included as part of a first PCBH symbol and a second DMRS being included in as part of a second PCBH symbol, wherein the first DMRS and second DMRS are quasi-orthogonal.

4. The method of claim 2,
   wherein an even frame is indicated by a first DMRS being included as part of a first PCBH symbol of a first frame and the first DMRS being included as part of a second PCBH symbol of the first frame,
   wherein an odd frame is indicated by a second DMRS being included as part of a first PCBH symbol of a second frame and the second DMRS being included as part of a second PCBH symbol of the second frame, and
   wherein the first DMRS and the second DMRS are quasi-orthogonal.

5. The method of claim 1 wherein the indication is signaled within one or more secondary synchronization signal (SSS) and primary synchronization signal (PSS).

6. The method of claim 5 further comprising:
   detecting the indication at least by:
   computing a first difference in channel estimates based on the SSS,
   computing a second difference in channel estimates based on the PSS, and
   comparing the first difference to the second difference to see which is not the same.

7. The method of claim 5 further comprising:
   decoding the SSS to determine whether the PBCH is multiplexed according to a first multiplexing scheme or a second multiplexing scheme.

8. The method of claim 7 further comprising:
   determining whether the PBCH supports initial access UEs based on whether the PBCH is multiplexed according to the first multiplexing scheme or the second multiplexing scheme.

9. A method comprising:
   generating, by a transmitting device, physical broadcast channel (PBCH), wherein the PBCH includes a master information block (MIB) comprising most significant bits (MSB)s of a system frame number (SFN) of a frame;
   generating at least one PBCH redundancy version (RV) comprising less significant bits (LSB)s of the SFN of the frame;
   creating an indication within a synchronization signal burst set (SSBS) indicating whether the frame is designated an even frame or an odd frame;
   including within the frame the MIB, the at least one PBCH RV and the indication; and
   transmitting the frame.

10. The method of claim 9 wherein the indication is signaled within one or more PBCH demodulated reference signal (DMRS).

11. The method of claim 10 wherein the indication is signaled by a first DMRS being included as part of a first PCBH symbol and a second DMRS being included in as part of a second PCBH symbol, wherein the first DMRS and second DMRS are quasi-orthogonal.

12. The method of claim 10,
   wherein an even frame is indicated by a first DMRS being included as part of a first PCBH symbol of a first frame and the first DMRS being included as part of a second PCBH symbol of the first frame,
   wherein an odd frame is indicated by a second DMRS being included as part of a first PCBH symbol of a second frame and the second DMRS being included as part of a second PCBH symbol of the second frame, and
   wherein the first DMRS and the second DMRS are quasi-orthogonal.

13. The method of claim 9 wherein the indication is signaled within one or more secondary synchronization signal (SSS) and primary synchronization signal (PSS).

14. The method of claim 9 wherein an amount of the LSBs is three bits.

15. The method of claim 9 wherein an amount of the LSBs is two bits.

16. A user equipment device comprising:
a receiver that receives a frame comprising a physical broadcast channel (PBCH), wherein the PBCH includes a master information block (MIB) comprising most significant bits (MSB)s of a system frame number (SFN) of the frame; and
one or more processor that decodes the MSBs of the SFN and determines whether the frame is designated an even frame or an odd frame based at least on an indication included within a synchronization signal burst set (SSBS) of the frame, wherein based at least on the decoded MSBs and the frame designation the one or more processor blind decodes a subset of less significant bits (LSB)s of the SFN to determine which of the subset of the LSBs are part of the SFN.

17. The device of claim 16 wherein the indication is signaled within one or more PBCH demodulated reference signal (DMRS).

18. The device of claim 17 wherein the indication is signaled by a first DMRS being included as part of a first PCBH symbol and a second DMRS being included in as part of a second PCBH symbol, wherein the first DMRS and second DMRS are quasi-orthogonal.

19. The device of claim 17,
wherein an even frame is indicated by a first DMRS being included as part of a first PCBH symbol of a first frame and the first DMRS being included as part of a second PCBH symbol of the first frame,
wherein an odd frame is indicated by a second DMRS being included as part of a first PCBH symbol of a second frame and the second DMRS being included as part of a second PCBH symbol of the second frame, and
wherein the first DMRS and the second DMRS are quasi-orthogonal.

20. The device of claim 16 wherein the indication is signaled within one or more secondary synchronization signal (SSS) and primary synchronization signal (PSS).

21. The device of claim 20 wherein the one or more processor detects the indication at least by computing a first difference in channel estimates based on the SSS, computing a second difference in channel estimates based on the PSS, and comparing the first difference to the second difference to see which is not the same.

22. The device of claim 20 wherein the one or more processor decodes the SSS to determine whether the PBCH is multiplexed according to a first multiplexing scheme or a second multiplexing scheme.

23. The device of claim 22 wherein the one or more processor determines whether the PBCH supports initial access UEs based on whether the PBCH is multiplexed according to the first multiplexing scheme or the second multiplexing scheme.

24. A system comprising:
code for receiving, by a user equipment (UE), a frame comprising a physical broadcast channel PBCH, wherein the PBCH includes a master information block (MIB) comprising most significant bits (MSB)s of a system frame number (SFN) of the frame;
code for decoding the MSBs of the SFN;
code for determining whether the frame is designated an even frame or an odd frame based at least on an indication included within a synchronization signal burst set (SSBS) of the frame; and
code for based at least on the decoded MSBs and the frame designation, blind decoding a subset of a less significant bits (LSB)s of the SFN to determine which of the subset of the LSBs are part of the SFN.

25. The system of claim 24 wherein the indication is signaled within one or more PBCH demodulated reference signal (DMRS).

26. The system of claim 25 wherein the indication is signaled by a first DMRS being included as part of a first PCBH symbol and a second DMRS being included in as part of a second PCBH symbol, wherein the first DMRS and second DMRS are quasi-orthogonal.

27. The system of claim 25,
wherein an even frame is indicated by a first DMRS being included as part of a first PCBH symbol of a first frame and the first DMRS being included as part of a second PCBH symbol of the first frame,
wherein an odd frame is indicated by a second DMRS being included as part of a first PCBH symbol of a second frame and the second DMRS being included as part of a second PCBH symbol of the second frame, and
wherein the first DMRS and the second DMRS are quasi-orthogonal.

28. The system of claim 24 wherein the indication is signaled within one or more secondary synchronization signal (SSS) and primary synchronization signal (PSS).

29. The system of claim 28 further comprising:
code for detecting the indication at least by:
code for computing a first difference in channel estimates based on the SSS,
code for computing a second difference in channel estimates based on the PSS, and
code for comparing the first difference to the second difference to see which is not the same.

30. The system claim 28 further comprising:
code for decoding the SSS to determine whether the PBCH is multiplexed according to a first multiplexing scheme or a second multiplexing scheme; and
code for determining whether the PBCH supports initial access UEs based on whether the PBCH is multiplexed according to the first multiplexing scheme or the second multiplexing scheme.

* * * * *